Patented June 14, 1932

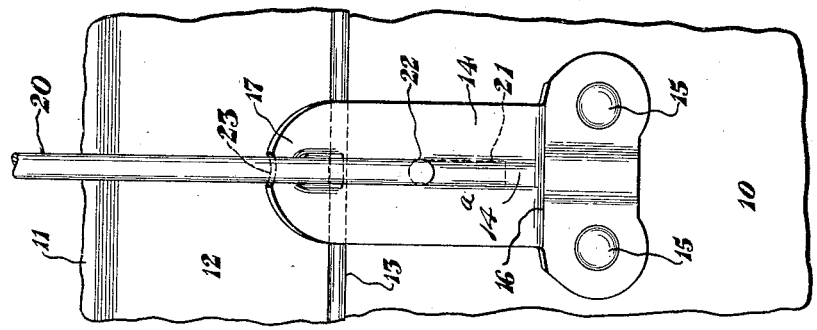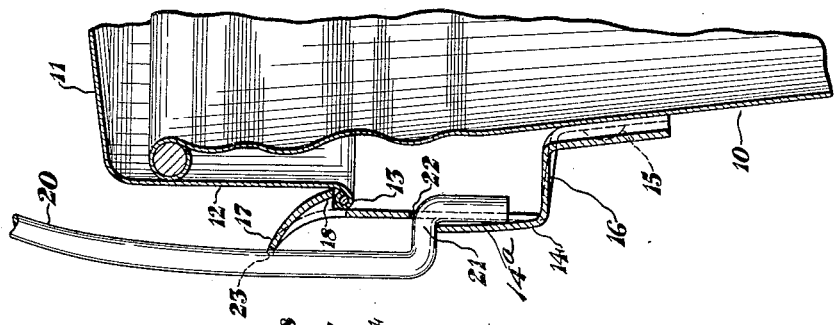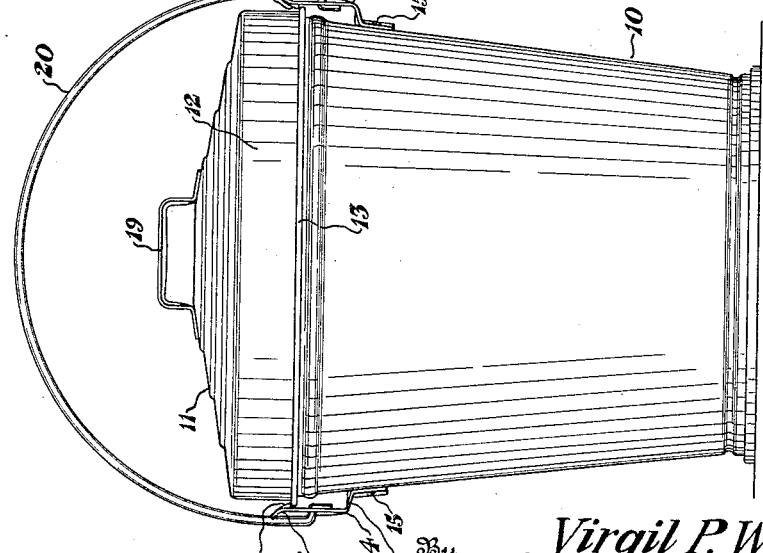

1,862,730

UNITED STATES PATENT OFFICE

VIRGIL P. WENDLE, OF DOVER, OHIO, ASSIGNOR TO THE REEVES MANUFACTURING COMPANY, OF DOVER, OHIO, A CORPORATION OF OHIO

COVER LOCK FOR PAILS

Application filed January 25, 1929. Serial No. 334,997.

The invention relates to means for locking covers upon pails, cans and the like and more particularly to a device of this kind especially adapted for use upon garbage cans.

The object of the improvement is to provide a simple and efficient locking means upon the can for locking the cover thereon in order to prevent the cover from being dislodged by dogs or other animals.

The above and other objects may be attained by providing a spring ear at each side of the can, near the upper open end thereof, and forming a tongue upon the ear for engagement with the usual bead around the lower end of the peripheral flange ordinarily formed upon covers of this character.

An embodiment of the invention is illustrated in the accompanying drawing, in which Figure 1 is a side elevation of a garbage can or the like provided with the improved locking means for retaining the cover thereon;

Fig. 2 a fragmentary sectional view upon an enlarged scale showing the upper portion of the can and the improved cover locking means in position for locking the cover upon the can; and Fig. 3, a fragmentary elevation of the same.

Similar numerals refer to similar parts throughout the drawing.

The can or pail 10 may be of any usual and well known construction and the cover 11 therefor may have the usual depending peripheral flange 12 terminating at its lower edge in the peripheral bead 13.

The improved cover locking device includes a one-piece ear 14 connected to each side of the can, near the upper open end thereof, as by rivets 15 or the like and is preferably offset from the can as at 16.

Each of these ears is arranged to extend up above the normal position of the bead 13, when the cover is in place upon the can and is preferably outwardly curved at its upper end as shown at 17 and has the resilient locking tongue 18 stamped inwardly therefrom and adapted to engage over the bead 13 of the cover to retain the same in position thereon.

In order to remove the cover, it is necessary to spring the ears outward until the locking tongues 18 are disengaged from the bead of the cover when the same may be lifted from the can as by the usual handle 19.

For the sake of convenience and economy, the usual handle bail 20 may be carried by the ears 14, preferably connected thereto below the locking tongues in any suitable manner as by providing angular portions 21 upon the ends of the bail for engagement in suitable openings 22 in the ears.

As shown in the drawing, the curved upper extremity of each ear may be provided with a rounded notch 23 to receive the handle bail and hold the same in raised position, as illustrated.

To assist in holding the bail in raised position, vertical channel portions 14a may be formed in the lower portions of the ears 14 and aligned with the openings 22. When the bail is moved to raised position the lower portions thereof will enter the channels 14a due to the outward pressure exerted by the curved portion 17 of the ear upon the bail, and the channels tend to hold the bail in upright position.

With the handle bail held in this position, the ears are locked against outward movement and the cover cannot be removed until the handle bail is lowered and the ears sprung out of engagement with the bead upon the cover.

I claim:

1. In combination with a receptacle, a cover therefor provided with a peripheral bead, a one-piece ear at each side of the receptacle near the upper end thereof, an integral resilient tongue upon each ear for locking engagement with the bead upon the cover, and a handle bail carried by said ears, each ear having a notch for engagement with the handle bail to hold the tongues in locking position.

2. In combination with a receptacle, a cover therefor provided with a peripheral bead, a one-piece ear carried upon the receptacle near the upper end thereof, an integral tongue upon the ear and adapted for locking engagement with the bead upon the cover, and a handle bail carried upon the ear and adapted for engagement with the upper edge thereof for holding the tongue in locking engagement with the bead when the bail is in raised position.

In testimony that I claim the above, I have hereunto subscribed my name.

VIRGIL P. WENDLE.